United States Patent
Schulmayr

(10) Patent No.: US 12,023,810 B2
(45) Date of Patent: Jul. 2, 2024

(54) SYSTEM FOR ACTIVE MOTION DISPLACEMENT CONTROL OF A ROBOT

(71) Applicant: Beckman Coulter, Inc., Brea, CA (US)

(72) Inventor: Günter Schulmayr, Höhenkirchen-Siegertsbrunn (DE)

(73) Assignee: Beckman Coulter, Inc., Brea, CA (US)

( * ) Notice: Subject to any disclaimer, the term of this patent is extended or adjusted under 35 U.S.C. 154(b) by 480 days.

(21) Appl. No.: 17/268,300

(22) PCT Filed: Aug. 13, 2019

(86) PCT No.: PCT/IB2019/056858
§ 371 (c)(1),
(2) Date: Feb. 12, 2021

(87) PCT Pub. No.: WO2020/035785
PCT Pub. Date: Feb. 20, 2020

(65) Prior Publication Data
US 2021/0299863 A1    Sep. 30, 2021

(30) Foreign Application Priority Data
Aug. 14, 2018 (EP) ..................................... 18188871

(51) Int. Cl.
*B25J 9/16* (2006.01)

(52) U.S. Cl.
CPC ........... *B25J 9/1628* (2013.01); *B25J 9/1664* (2013.01)

(58) Field of Classification Search
CPC .............................. B25J 9/1664; B25J 9/1628
See application file for complete search history.

(56) References Cited

U.S. PATENT DOCUMENTS

| | | |
|---|---|---|
| 7,400,956 B1 | 7/2008 | Feller et al. |
| 2001/0037185 A1 | 11/2001 | Strietzel et al. |

(Continued)

FOREIGN PATENT DOCUMENTS

| | | |
|---|---|---|
| CN | 105717924 | 6/2016 |
| CN | 107748540 | 3/2018 |

OTHER PUBLICATIONS

Javier Pliego-Jiménez, Marco A. Arteaga-Pérez, Adaptive position/force control for robot manipulators in contact with a rigid surface with uncertain parameters, European Journal of Control, vol. 22, 2015, pp. 1-12, ISSN 0947-3580, doi: 10.1016/j.ejcon.2015.01.003 (Year: 2015).*

(Continued)

*Primary Examiner* — Abby Y Lin
*Assistant Examiner* — Dylan Brandon Mooney
(74) *Attorney, Agent, or Firm* — Frost Brown Todd LLP

(57) ABSTRACT

The present invention relates to a system (100) for active motion displacement control of a robot, the system comprising: a DCL device (110), which is configured to set a desired position of a portion of a kinematic chain; a MDB device (120), which is configured to generate a motion profile for at least one actor device (130) coupled to the portion of the kinematic chain based on the set desired position of the portion of the kinematic chain; the actor device (130), which is configured to move the portion of the kinematic chain to an actual position based on the generated motion profile; a sensor device (140), which is configured to measure the actual position of the portion of the kinematic chain and, thereon based, provide position data of the portion of the kinematic chain; wherein the MDB device (120) is further configured to determine an estimated offset and provide a feedback path to a control loop used by the MDB device (120) based on the provided position data of (Continued)

the portion, the desired position of the portion, and the estimated offset.

14 Claims, 10 Drawing Sheets

(56) References Cited

U.S. PATENT DOCUMENTS

| | | | | |
|---|---|---|---|---|
| 2004/0267404 | A1* | 12/2004 | Danko | E02F 3/438 |
| | | | | 700/245 |
| 2005/0234566 | A1* | 10/2005 | Joublin | B25J 9/1697 |
| | | | | 700/61 |
| 2012/0158179 | A1* | 6/2012 | Ooga | B25J 9/1633 |
| | | | | 901/47 |
| 2015/0088309 | A1 | 3/2015 | Doll et al. | |
| 2016/0136805 | A1* | 5/2016 | Søe-Knudsen | G05B 19/4083 |
| | | | | 700/254 |
| 2016/0346931 | A1* | 12/2016 | Gottlieb | B25J 9/1692 |
| 2019/0061150 | A1* | 2/2019 | Yamaoka | B25J 9/1697 |
| 2020/0298403 | A1* | 9/2020 | Nilsson | B25J 9/1692 |

OTHER PUBLICATIONS

"Notification of European Publication Number—Article 67(3) EPC", (Jun. 22, 2020), 1 page.

"Extended European Search Report Received", (dated Feb. 20, 2019), 10 pages.

Erlic, M., "A reduced-order adaptive velocity observer for manipulator control", IEEE Transactions on Robotics and Automation, vol. 11, No. 2, (Apr. 1995), pp. 293-303.

Koivo, A. J., "Industrial Manipulator Control Using Kalman Filter and Adaptive Controller", IFAC Proceedings Volumes, vol. 15, No. 4, (Jun. 1982), pp. 265-270.

Murray, Richard M., "A Mathematical Introduction to Robotic Manipulation", Book, (1994), Chapter 4, Section 5.

Siciliano, Bruno, "Robotics Modelling, Planning and Control", Springer, (2009), Chapters 4 and 8.

"Chinese Application Serial No. 201980026746.0, Office Action dated Jan. 30, 2024", with machine translation, 12 pgs.

"European Application Serial No. 18188871.0, Response filed Aug. 18, 2020 to Extended European Search Report dated Feb. 20, 2019", 21 pgs.

* cited by examiner

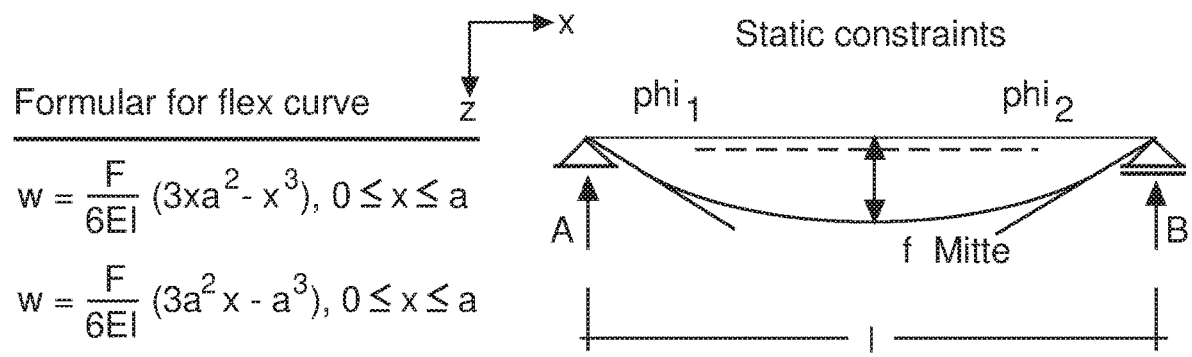
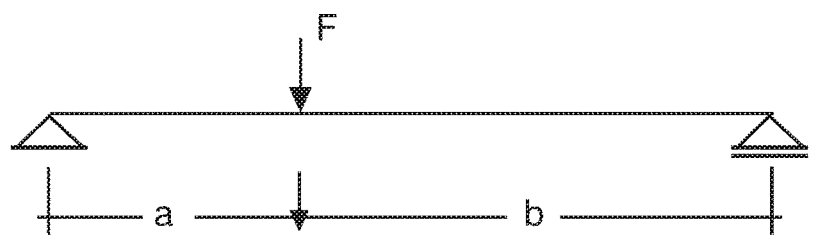
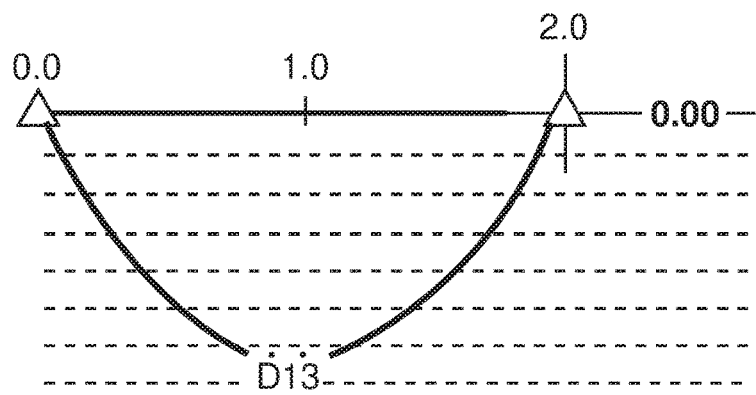
Fig. 6

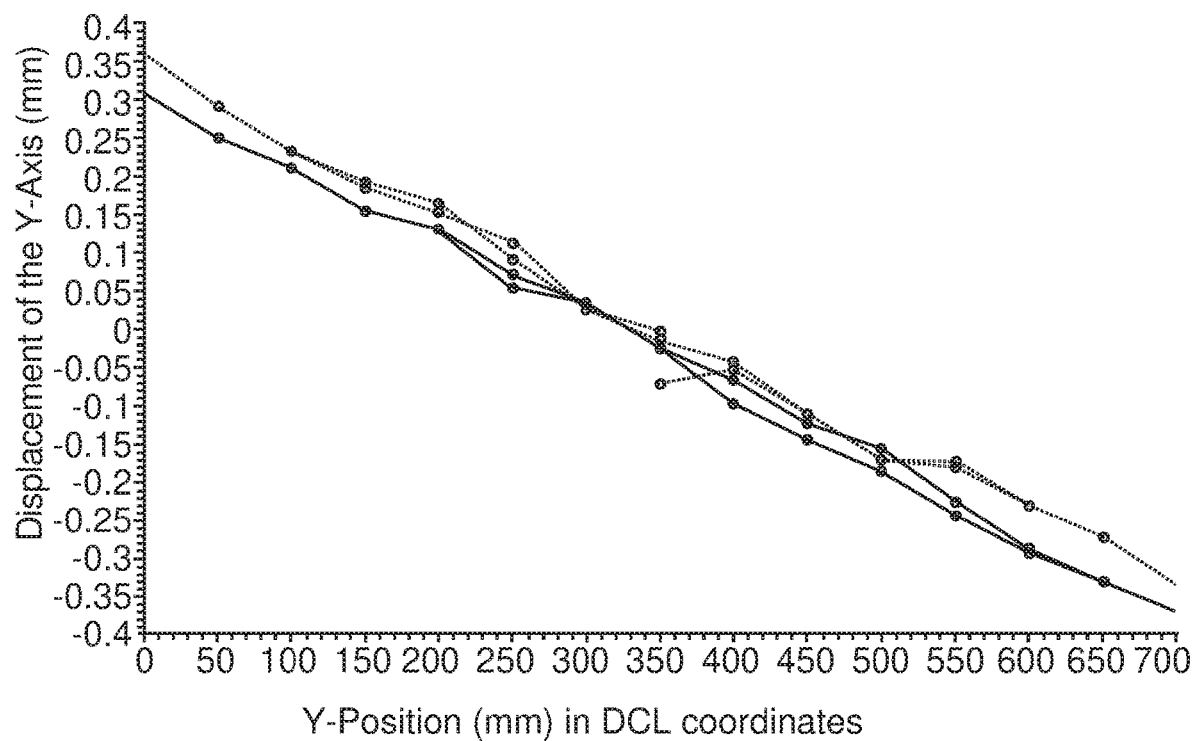
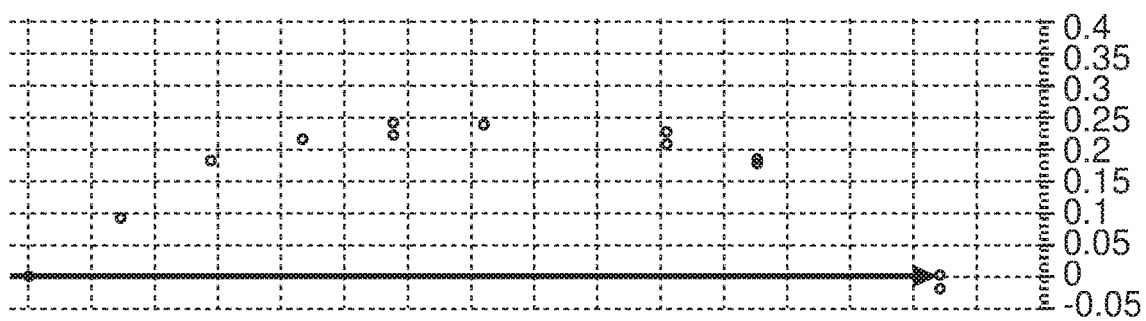
Fig. 7

SYSTEM FOR ACTIVE MOTION DISPLACEMENT CONTROL OF A ROBOT

CROSS-REFERENCE TO RELATED APPLICATION

This application is a U.S. National Stage Filing under 35 U.S.C. 371 from International Application No. PCT/IB2019/056858, filed on Aug. 13, 2019, and published as WO 2020/035785 A1 on Feb. 20, 2020, which application claims the benefit of priority to EP Application No. 18188871.0, filed Aug. 14, 2018, both of which are incorporated herein by reference in their entireties.

FIELD OF THE INVENTION

The invention relates to motion displacement controlling of robots. Moreover, the invention relates to systems and methods for active motion displacement control of a robot.

BACKGROUND OF THE INVENTION

Controlling the position or displacement of manipulators in controlled robots is a challenge because the position or displacement in three-dimensional spaces are not reached with estimated quality. For example, encoders may not report the real absolute values, encoders may have nonlinearities, an axis may be influenced by other axis at the same robot, an axis may be influenced by other robots or an axis may be influenced by surrounding conditions.

Generally speaking, the robotic system forms a closed chain mechanism that is extremely nonlinear and coupled, which has an effect on the controller design. Small errors in the trajectories will result in greater displacement errors, therefore it is necessary to precisely measure and control the position or displacement of manipulators.

Thus, it may be favorable to precisely control the position or displacement of manipulators.

SUMMARY OF THE INVENTION

It may therefore be desirable to provide for an improved system for active motion displacement control of a robot. Particularly, embodiments of the present invention may allow for eliminating of static axis displacements. Further, embodiments of the present invention provide that dynamic axis displacements may be eliminated on the fly and high level software will not have to care about sophisticated control systems like e.g. measurement control layer, MCL.

In addition, embodiments of the present invention may allow eliminating displacements in real time on lower levels for everyone using device control layer, DCL. This advantageously provides a cost reduction in hardware possible by equal position quality, a small and cheap rework in existing soft and hardware.

These and other advantages are achieved by the subject-matter of the independent claims, wherein further embodiments are incorporated in the dependent claims and the following description.

A first aspect of the invention relates to a system for active motion displacement control of a robot. The system comprises a device control layer, DCL, device, which is configured to set a desired position of a portion of a kinematic chain.

The system further comprises a motor driver board, MDB, device, which is configured to generate a motion profile for at least one actor device coupled to the portion of the kinematic chain based on the set desired position of the portion of the kinematic chain. Further, the system comprises the actor device, which is configured to move the portion of the kinematic chain to an actual position based on the generated motion profile.

The system further comprises a sensor device, which is configured to measure the actual position of the portion of the kinematic chain and, thereon based, provide position data of the portion of the kinematic chain, wherein the MDB device is further configured to determine an estimated offset and provide a feedback path to a control loop used by the MDB device based on the provided position data of the portion, the desired position of the portion, and the estimated offset.

According to an embodiment of the invention, the MDB device is further configured to provide the feedback path based on an equation in that a difference between the actual position of the portion and the desired position of the portion is compensated by the determined estimated offset.

According to an embodiment of the invention, the MDB device is further configured to determine the estimated offset based on a hardware dynamic model of the portion of the kinematic chain.

According to an embodiment of the invention, the MDB device is further configured to determine the hardware dynamic model of the portion of the kinematic chain based on static axis nonlinearities of the kinematic chain.

According to an embodiment of the invention, the MDB device is further configured to determine the hardware dynamic model of the portion of the kinematic chain:
  i) based on a weight of an object picked by the kinematic chain; and/or
  ii) based on a position of an/the object picked by the kinematic chain; and/or
  iii) based on a position of the portion of the kinematic chain.

According to an embodiment of the invention, the MDB device is further configured to determine the hardware dynamic model of the portion of the kinematic chain:
  i) based on static constraints of the kinematic chain; and/or
  ii) based on bending moments of the kinematic chain.

According to an embodiment of the invention, the MDB device is further configured to smooth the control loop used by the MDB device based on the provided feedback path.

According to an embodiment of the invention, the MDB device is further configured to determine the estimated offset within a predefined offset range.

According to an embodiment of the invention, the MDB device is further configured to determine the estimated offset based on a lookup table.

According to an embodiment of the invention, the MDB device is further configured to generate the lookup table by simulations of the kinematic chain and/or by measurements of the kinematic chain, optionally by using a three-dimensional laser scanner.

According to an embodiment of the invention, the MDB device is further configured to generate the lookup table in terms of a multidimensional lookup table.

According to an embodiment of the invention, the MDB device is further configured to determine the estimated offset by an interpolation of the lookup table.

According to an embodiment of the invention, the MDB device is further configured to provide a linear interpolation or a non-linear interpolation of the lookup table in order to determine the estimated offset.

According to an embodiment of the invention, the MDB device is further configured to provide a curve fitting based on the lookup table in order to determine the estimated offset.

According to an embodiment of the invention, the MDB device is further configured to determine the estimated offset by applying fuzzy logic, artificial intelligence or neural networks to the lookup table.

A second aspect of the present invention relates to a method for active motion displacement control of robots, the method comprising the following steps:

As a first step, the method comprises the step of setting a desired position of a portion of a kinematic chain, by means of a DCL device. Further, as a second step, the method comprises the step of generating a motion profile for at least one actor device coupled to the portion of the kinematic chain based on the set desired position of the portion of the kinematic chain by means of a MDB device.

In a further, third step, moving of the portion of the kinematic chain to an actual position based on the generated motion profile by means of the actor device is performed. Subsequently, the fourth step of measuring the actual position and, thereon based, providing position data of the portion of the kinematic chain by means of a sensor device is conducted.

Finally, the fifth step of method in terms of determining an estimated offset is performed as well as providing a feedback path to a control loop used by the MDB device based on the provided position data of the portion, the desired position of the portion, and the estimated offset, by means of the MDB device.

A third aspect of the invention relates to a computer program product comprising instructions which, when the program is executed by a computer, cause the computer to carry out the steps the method according to the second aspect or any implementation or embodiment of the second aspect.

A fourth aspect of the invention relates to a computer-readable storage medium comprising instructions which, when the program is executed by a computer, cause the computer to carry out the steps the method according to the second aspect or any implementation or embodiment of the second aspect.

It is emphasized that any feature, element and/or function, which is described hereinabove and hereinafter with reference to one aspect of the invention, equally applies to any other aspect of the invention, as described hereinabove and hereinafter.

Particularly, features, elements and/or functions, as described hereinabove and hereinafter with reference to the system for active motion displacement control of robots according to the first aspect, equally apply to the method for active motion displacement control of robots according to the second aspect and/or to the computer program product according to the third aspect, and vice versa.

These and other aspects of the invention will be apparent from and elucidated with reference to the embodiments described hereinafter.

BRIEF DESCRIPTION OF THE DRAWINGS

The subject-matter of the invention will be explained in more detail in the following with reference to exemplary embodiments which are illustrated in the attached drawings, wherein:

FIG. 6 shows a schematic diagram for a calculation of an offset according to exemplary embodiments of the invention;

FIG. 7 shows a diagram of measurements according to exemplary embodiments of the invention;

In principle, identical or like parts are provided with identical or like reference symbols in the figures.

DETAILED DESCRIPTION OF EXEMPLARY EMBODIMENTS

The term "device control layer", abbreviated DCL, as used by the present description may be understood as to refer to a software layer that performs lower level control of hardware devices on a programmable logic controller, PLC, or on a circuit board.

Figure 1:
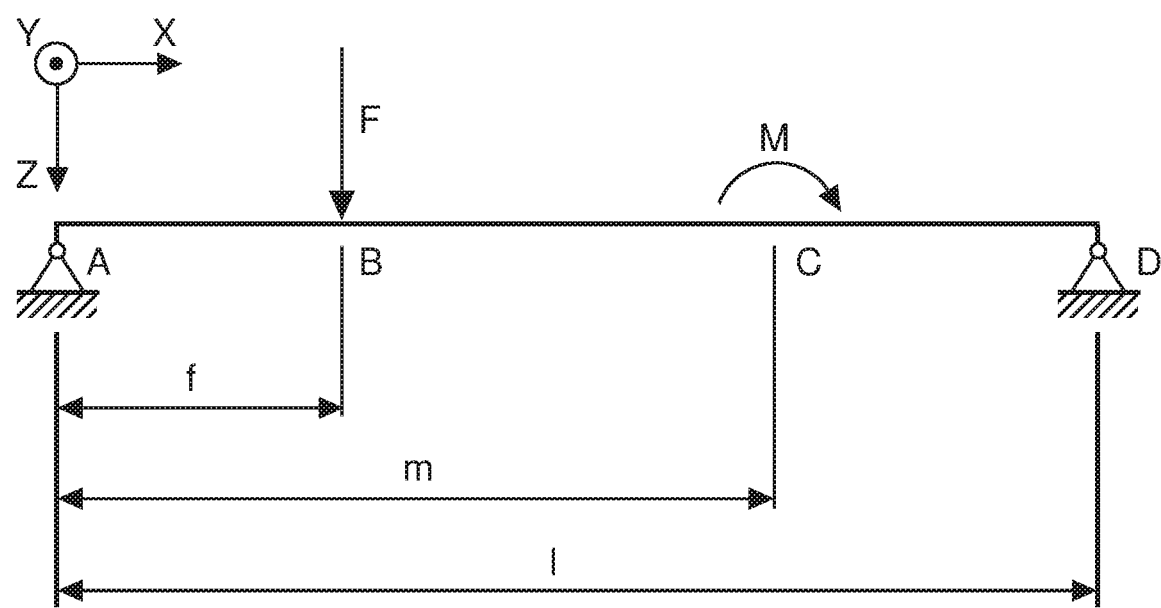
FIG. 1 shows schematically a sketch of a chain segment of a robotic system according to an exemplary embodiment of the invention.

FIG. 1 shows a schematic sketch of a chain segment of a robotic system according to an exemplary embodiment of the invention.

FIG. 1 shows possible quality criteria used by the method for active motion displacement control of a robot according to exemplary embodiments of the invention.

In one embodiment of the present invention, the hardware, HW, mounting parameters of the kinematic chain or the robotic chain are provided or measured by a sensor device.

In one embodiment of the present invention a position, or a vector of one component or element of the robotic chain is used as input data, also further data or parameters are used dealing with geometric constraints of the robotic chain.

For example, a desired position of a portion of a kinematic chain may be defined by an actor positions, in terms of an absolute position, or in terms of a linearity or an origin to model and estimate parameters of robotic systems.

In one embodiment of the present invention, the desired position of the portion of the kinematic chain may be defined by HW reality, by software, SW, desired, by a HW sensor or by SW feedback. In other words, the desired position of the portion of the kinematic chain may be determined by physical measurements, by models and simulation or by identification, either hardware-based or software-based.

In one embodiment of the present invention, statistic may be calculated and provided by means of accuracy, or by repeatability or by correlation.

In one embodiment of the present invention, the MDB device 120 may for example be further configured to determine an estimated offset and provide a feedback path to a control loop used by the MDB device 120 based on accuracy, or on repeatability or on correlation of the provided position data of the portion or of the desired position of the portion or of the estimated offset.

In one embodiment of the present invention, statistic may be calculated and provided by means of accuracy, or by repeatability or by correlation. The MDB device 120 may for example be further configured to determine an estimated offset and provide a feedback path to a control loop used by the MDB device 120 based on position data relative to a frame, or a position of an origin relative to frame.

In one embodiment of the present invention, the MDB device 120 may for instance be further configured to determine an estimated offset and provide a feedback path to a control loop used by the MDB device 120 based on a position of a motor on an axis, the position of the motor may be defined a position of an origin, or a In one embodiment of the present invention, the MDB device 120 may for instance be further configured to determine an estimated offset and provide a feedback path to a control loop used by the MDB device 120 based on a position of a home sensor.

Figure 2:
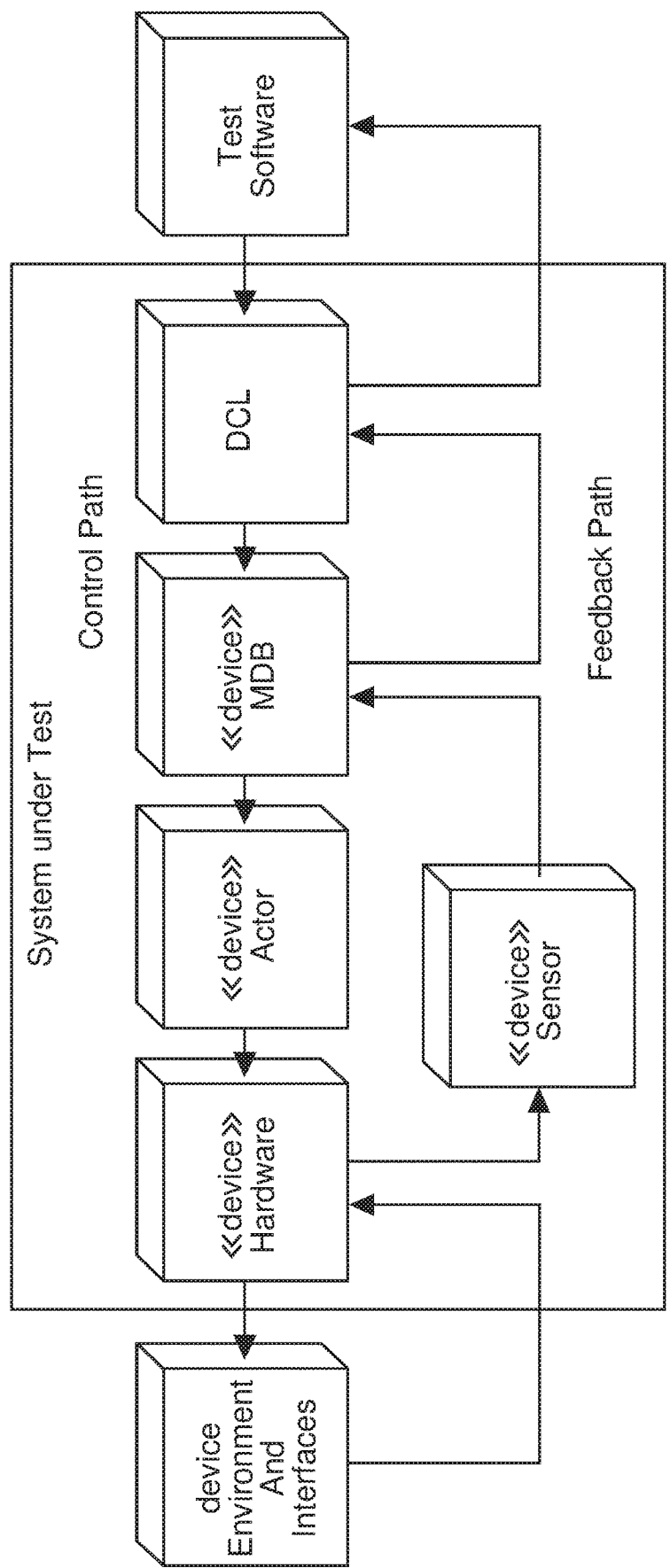
FIG. 2 shows schematically a building block flowchart diagram for explaining the invention.

FIG. 2 schematically shows a building block flowchart diagram for explaining the invention.

The building block flowchart diagram as shown in FIG. 2 visualizes test software and represents higher levels of the software and control steps performed by the test software.

The DCL device may be configured to set any required destination position or to define a range of suitable destination positions.

The MDB device may be further configured to generate motion profiles.

The actor device may be further configured to move at least one element or component of the robotic chain.

The sensor device may be further configured to deliver input data for the actual MDB device for controlling the kinematic chain, where for instance a difference between an actual position and a desired position of an element or component of the robotic chain is set to zero.

Figure 3:
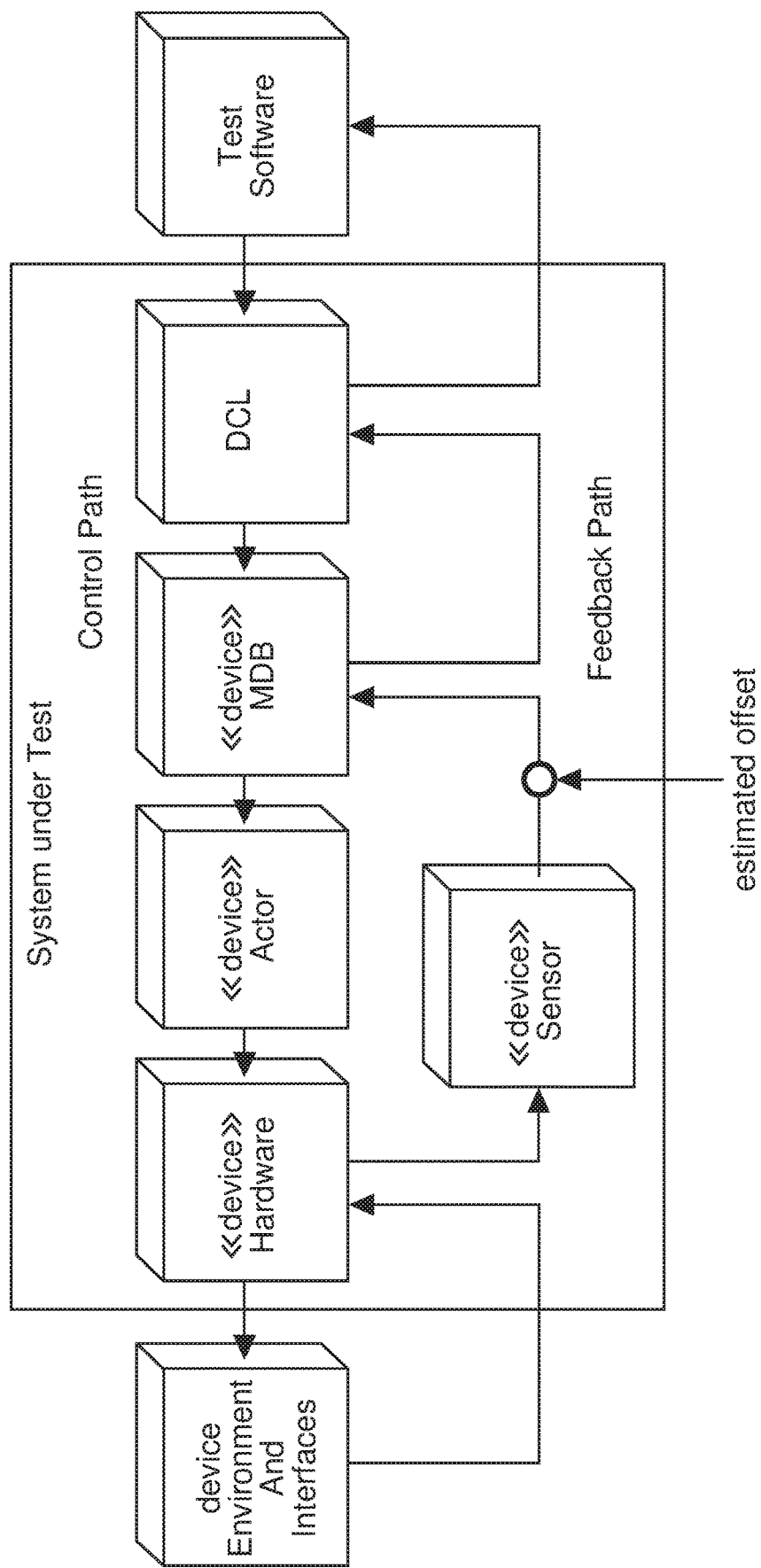
FIG. 3 shows a schematic building block flowchart diagram according to exemplary embodiments of the invention.

FIG. 3 shows a schematic building block flowchart diagram according to exemplary embodiments of the invention.

The building block flowchart diagram visualizes test software and represents higher levels of the software and control steps performed by the test software.

In one embodiment of the present invention, the DCL device 110 may be configured to set any required destination position or to define a range of suitable destination positions.

In one embodiment of the present invention, the MDB device 120 may be further configured to generate motion profiles.

In one embodiment of the present invention, the actor device 130 may be further configured to move at least one element or component of the robotic chain.

In one embodiment of the present invention, the sensor device 120 may be further configured to deliver input data for the actual MDB device 120 for controlling the kinematic chain, where for instance a difference between an actual position and a desired position of an element or component of the robotic chain is set to an offset value, the offset value may for instance may be different from zero. In other words, the offset may be a positive value or a negative value.

Adding the estimated offset to the control loop is not limited to the shown location of the block diagram.

Figure 4:
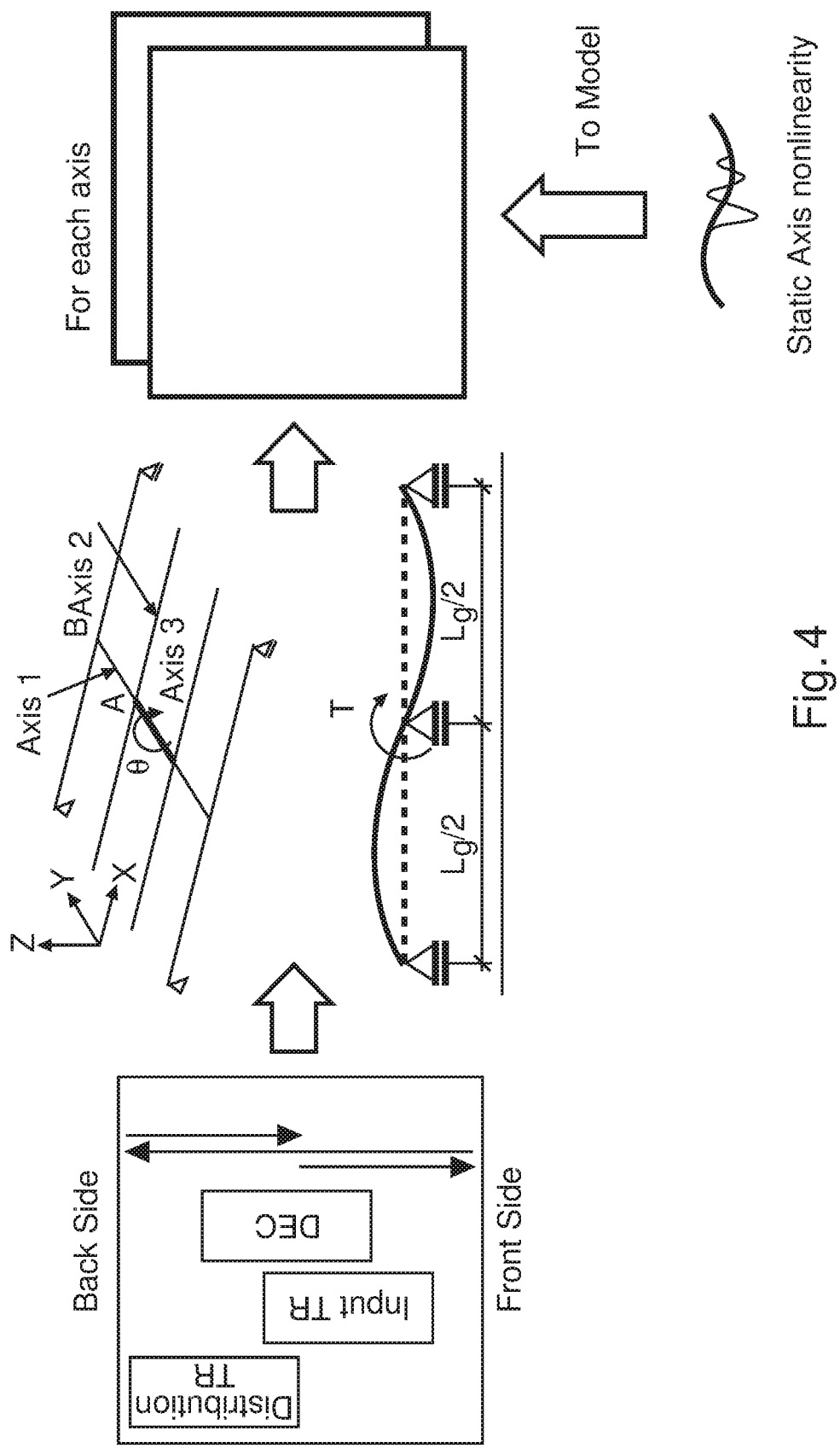
FIG. 4 shows a schematic building block flowchart diagram for a control offset estimation according to exemplary embodiments of the invention.

FIG. 4 shows a schematic building block flowchart diagram for a control offset estimation according to exemplary embodiments of the invention.

FIG. 4 visualizes how the MDB device 120 is further configured to provide the offset estimation in terms of determining the estimated offset and to provide a feedback path to a control loop used by the MDB device 120 based on the provided position data of the portion, the desired position of the portion, and the estimated offset.

In one embodiment of the present invention, the MDB device 120 is further configured to calculate, for each axis, for instance, any static axis nonlinearities in terms of position, force, or motion vector are provided as input data to model the kinematic chain.

In one embodiment of the present invention, further, also for each axis, position of any element or components of the kinematic chain are provided as input data for the MDB device to model the kinematic chain. This may comprise further hardware dynamics or geometric constraints of the robotic chain.

Figure 5:
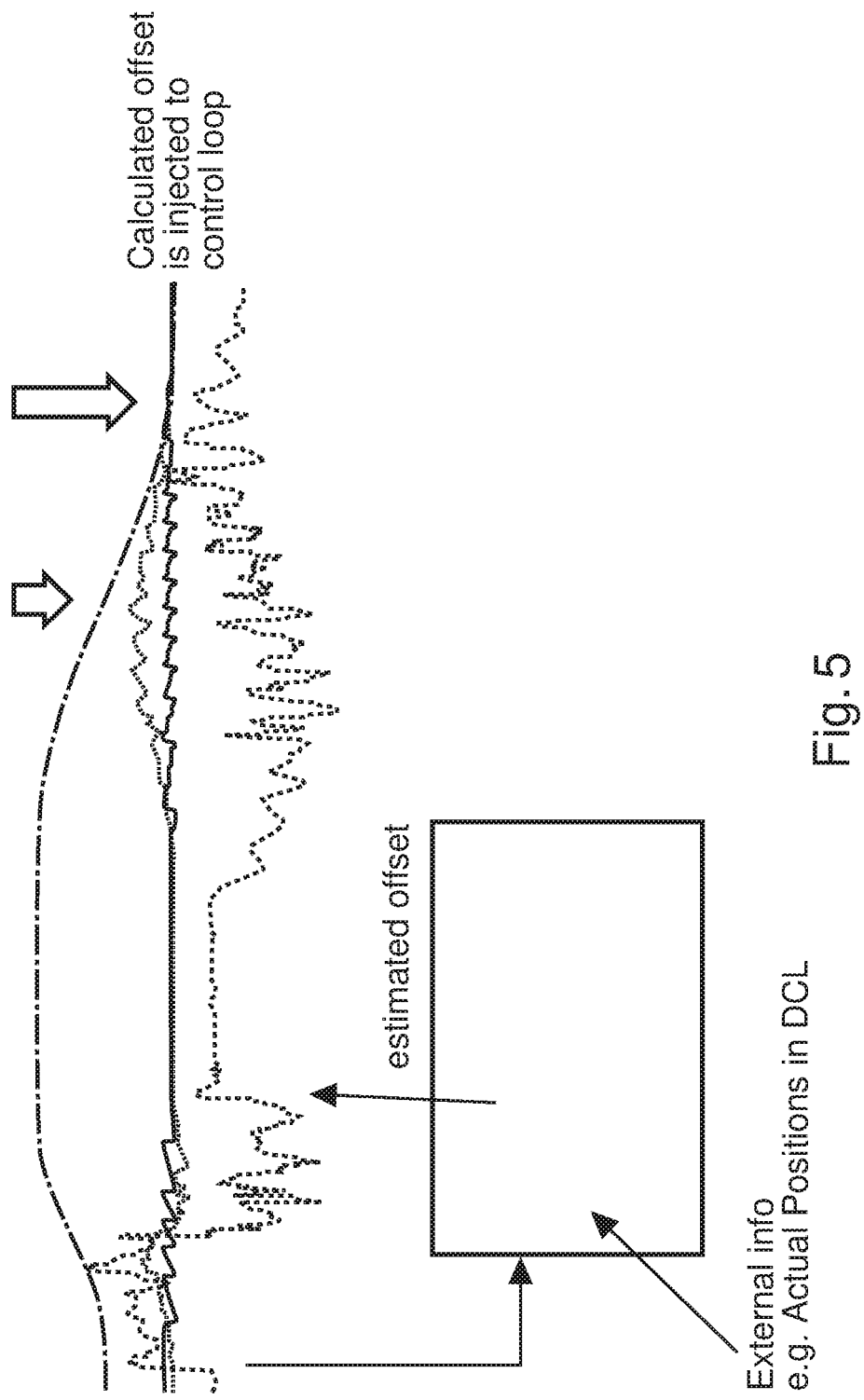
FIG. 5 shows a schematic building block flowchart diagram for a control single motion sample according to exemplary embodiments of the invention.

FIG. 5 shows a schematic building block flowchart diagram for a control single motion sample according to exemplary embodiments of the invention.

In one embodiment of the present invention, the calculated estimated offset may for instance be injected to control loop as used by the MDB device 120. In one embodiment of the present invention, the calculated estimated offset may be provided as a function of actual positions of an element or a component of the robotic chain, also called kinematic chain.

In one embodiment of the present invention, the smoothing may be done automatically by MDB control loop and by using for instance HW inertia.

In one embodiment of the present invention, the MDB device 120 may be further configured to set a maximum or minimum offset value, e.g. the maximum o offset may be defined e.g. +/−1.5 mm. For example, a typical offset may be defined by a value of +/−0.5 mm.

In one embodiment of the present invention, the MDB device 120 is further configured to send commands that will still work with default coordinate system but much more precise.

FIG. 6 shows a schematic diagram for a calculation of an offset according to exemplary embodiments of the invention.

In one embodiment of the present invention, the MDB device 120 is further configured to calculate a correction offset based on a robotic chain with a first axis comprising a first lifting capacity and a second axis with a second lifting capacity, wherein the second lifting capacity is higher than the first lifting capacity.

For example, the second axis is configured to pick and place objects using a higher force compared to the first axis. In other words, the second axis is specifically configured to provide higher force values for lifting heavy objects, e.g. for example objects with a mass of more than several kilograms, for example more than 10 kg or more than 100 kg or more than 200 kg. For example, mass can be weighed.

In one embodiment of the present invention, the MDB device 120 is further configured to calculate data or to receive measurement data about a weight of object currently picked by an axis and the weight of the picked object is taken into account for estimating the displacement offset of an element of the kinematic chain.

In one embodiment of the present invention, the MDB device 120 is further configured to calculate the estimated offset as a function of an actual position of an element or a component of the robotic or kinematic chain and a weight of the picked object.

In one embodiment of the present invention, the MDB device 120 is further configured to calculate the estimated offset as a function of an actual Z-position or a height of an element or a component of the robotic or kinematic chain and a weight of the picked object. The MDB device 120 is further configured to provide a sequential or loop testing and a trajectory or displacement optimization.

FIG. 7 shows a diagram of measurements according to exemplary embodiments of the invention.

In one embodiment of the present invention, the diagram on the top part of FIG. 7 shows a typical displacement on the Z-Axis versus a position of other robot.

In one embodiment of the present invention, the diagram on the lower part of FIG. 7 shows a typical displacement on the Z-Axis due versus a torsion of the X-Axis. In one embodiment of the present invention, the torsion is affected by the Y-Position of same robot and/or by the Y-Position of other robots.

In one embodiment of the present invention, the torsion of the X-Axis may lead to displacement of robots pick position.

Figure 8:
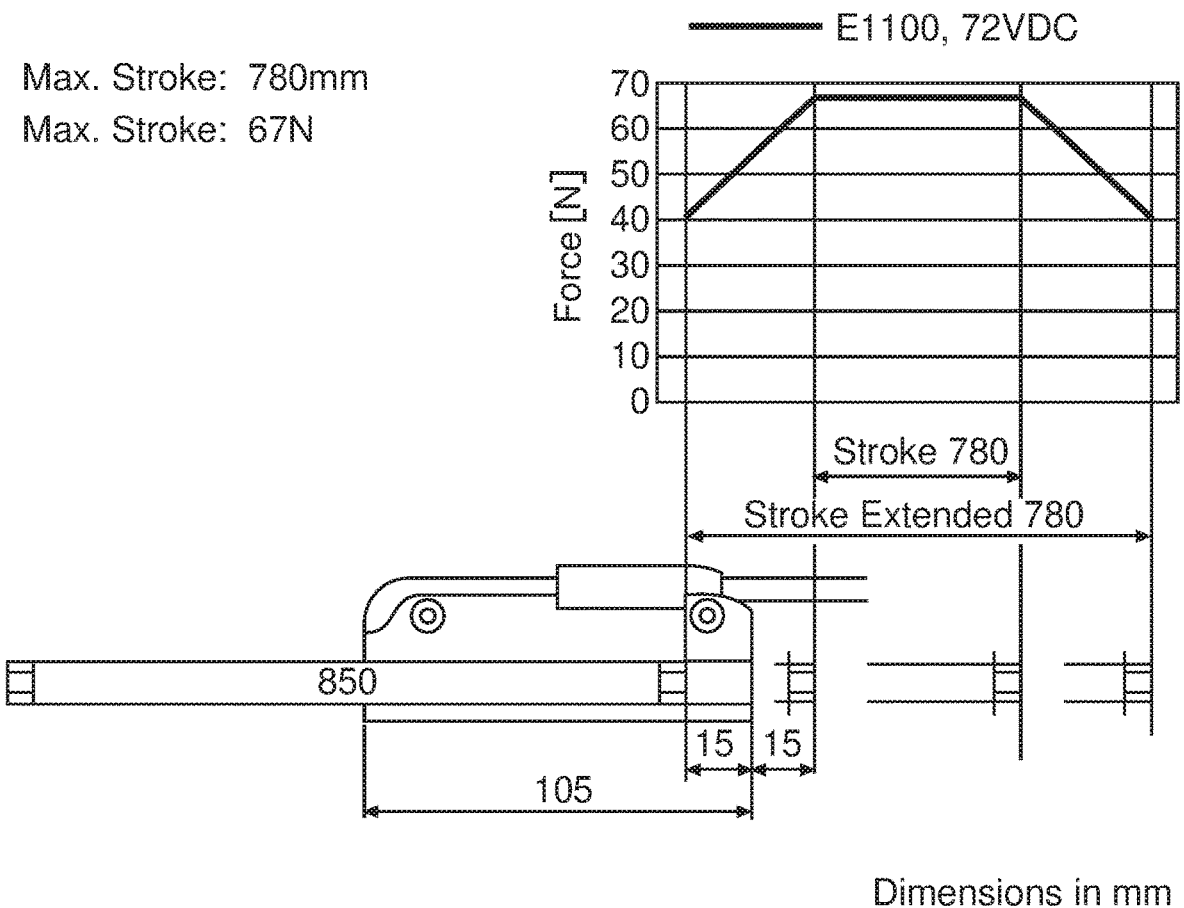
FIG. 8 shows a schematic diagram of an actor according to exemplary embodiments of the invention.

FIG. 8 shows a schematic diagram of an actor according to exemplary embodiments of the invention.

Figure 9:
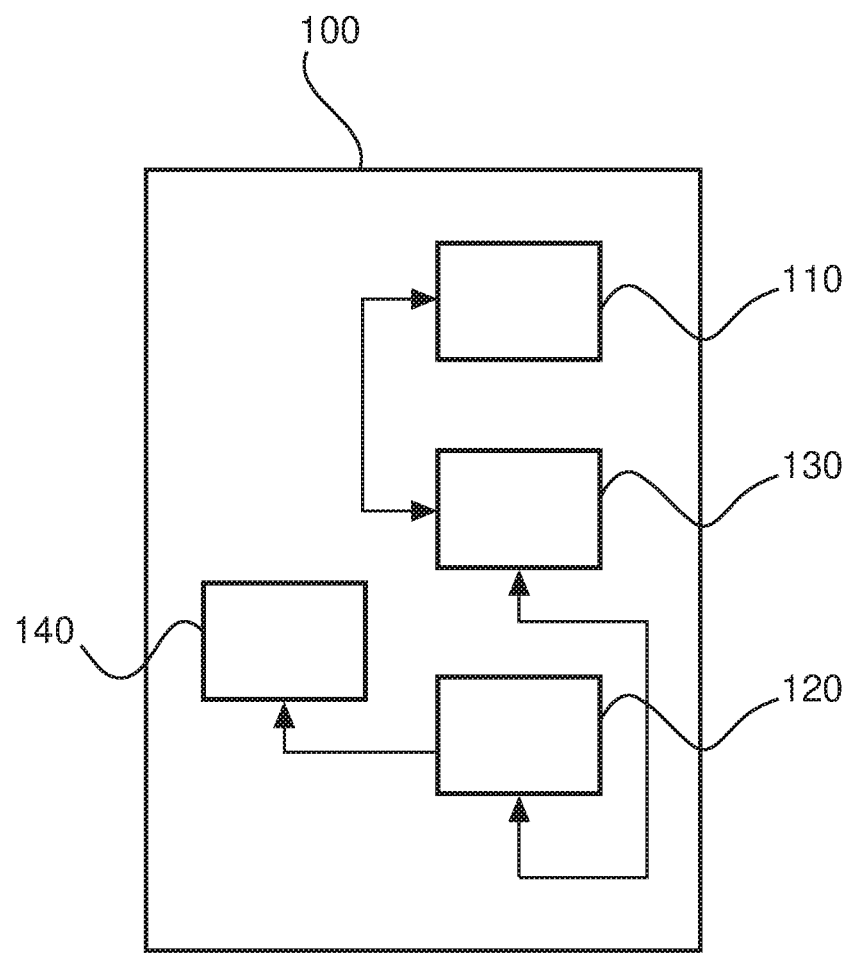
FIG. 9 shows a schematic diagram of a system for active motion displacement control of a robot according to exemplary embodiments of the invention.

FIG. 9 shows a schematic diagram of a system for active motion displacement control of a robot according to exemplary embodiments of the invention.

The system 100 may comprise a DCL device 110, a MDB device 120, an actor device 130, and a sensor device 140.

The DCL device 110 is configured to set a desired position of a portion of a kinematic chain.

The MDB device 120 is configured to generate a motion profile for the or at least one actor device 130 coupled to the portion of the kinematic chain based on the set desired position of the portion of the kinematic chain.

The actor device 130 is configured to move the portion of the kinematic chain to an actual position based on the generated motion profile.

The sensor device 140 is configured to measure the actual position of the portion of the kinematic chain and, thereon based, provide position data of the portion of the kinematic chain.

The MDB device 120 is further configured to determine an estimated offset and provide a feedback path to a control loop used by the MDB device 120 based on the provided position data of the portion, the desired position of the portion, and the estimated offset.

Figure 10:
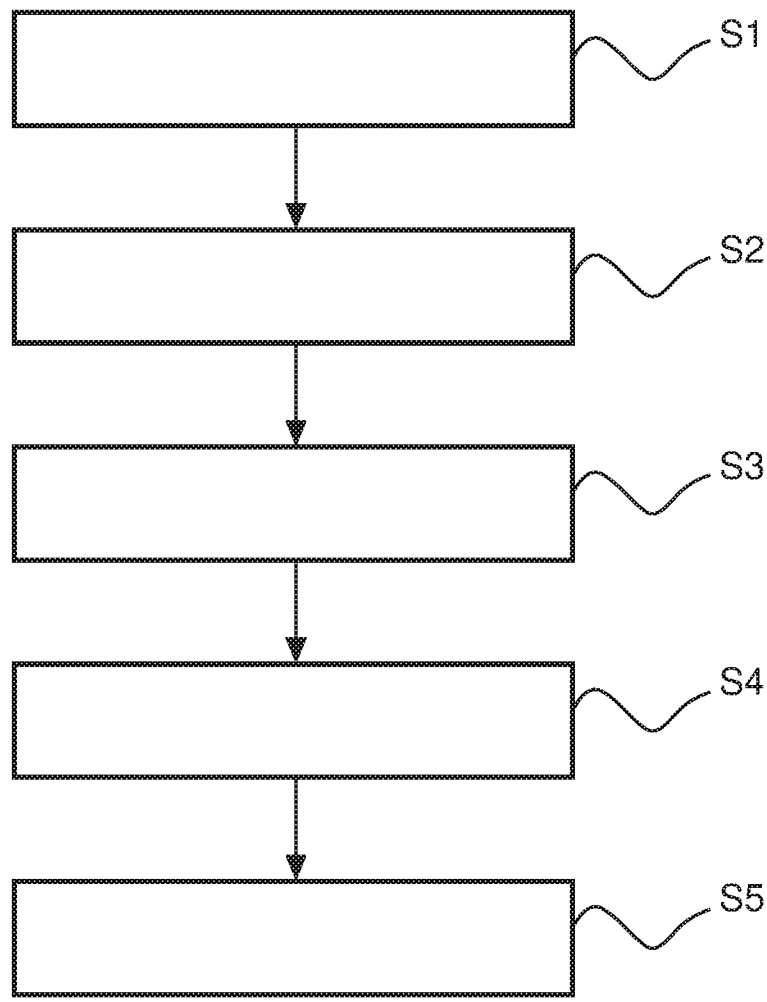
FIG. 10 shows a schematic flowchart diagram of a method for active motion displacement control of a robot according to exemplary embodiments of the invention.

FIG. 10 shows a schematic flowchart diagram of a method for active motion displacement control of a robot according to exemplary embodiments of the invention.

As a first step, the method comprises the step of setting S1 a desired position of a portion of a kinematic chain, by means of a DCL device.

Further, as a second step, the method comprises the step of generating S2 a motion profile for at least one actor device coupled to the portion of the kinematic chain based on the set desired position of the portion of the kinematic chain by means of a MDB device.

In a further, third step, moving S3 of the portion of the kinematic chain to an actual position based on the generated motion profile by means of the actor device is performed.

Further, the fourth step of measuring S4 the actual position and, thereon based, providing position data of the portion of the kinematic chain by means of a sensor device is conducted.

Finally, the fifth step of determining S5 an estimated offset is performed as well as providing a feedback path to a control loop used by the MDB device based on the provided position data of the portion, the desired position of the portion, and the estimated offset, by means of the MDB device.

It has to be noted that embodiments of the invention are described with reference to different subject matters. In particular, some embodiments are described with reference to method type claims whereas other embodiments are described with reference to the device type claims.

However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practicing the claimed invention, from a study of the drawings, the disclosure, and the appended claims.

In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A system for active motion displacement control of a robot, the system comprising:
   a device control layer (DCL) device which is configured to set a desired position of a portion of a kinematic chain;
   a motor driver board (MDB) device which is configured to generate a motion profile for at least one actor device coupled to the portion of the kinematic chain based on the set desired position of the portion of the kinematic chain;
   the actor device, which is configured to move the portion of the kinematic chain to an actual position based on the generated motion profile;
   a sensor device, which is configured to measure the actual position of the portion of the kinematic chain and, based on the measured actual position, provide position data of the portion of the kinematic chain; and
   wherein the MDB device is further configured to:
   determine an estimated offset based on a robotic chain with a first axis comprising a first lifting capacity and a second axis with a second lifting capacity, wherein the second lifting capacity is higher than the first lifting capacity; and
   provide a feedback path to a control loop used by the MDB device based on the provided position data of the portion, the desired position of the portion, and the estimated offset.

2. The system according to claim 1, wherein the MDB device is further configured to provide the feedback path based on an equation in that a difference between the actual position of the portion and the desired position of the portion is compensated by the determined estimated offset.

3. The system according to claim 1, wherein the MDB device is further configured to determine the estimated offset based on a hardware dynamic model of the portion of the kinematic chain.

4. The system according to claim 3, wherein the MDB device is further configured to determine the hardware dynamic model of the portion of the kinematic chain based on static axis nonlinearities of the kinematic chain.

5. The system according to claim 3,
wherein the MDB device is further configured to determine the hardware dynamic model of the portion of the kinematic chain:
i) based on a weight of an object picked by the kinematic chain; and/or
ii) based on a position of an/the object picked by the kinematic chain; and/or
iii) based on a position of the portion of the kinematic chain.

6. The system according to claim 3, wherein the MDB device is further configured to determine the hardware dynamic model of the portion of the kinematic chain:
i) based on constraints of the kinematic chain; and/or
ii) based on bending moments of the kinematic chain.

7. The system according to claim 1, wherein the MDB device is further configured to smooth the control loop used by the MDB device based on the provided feedback path.

8. The system according to claim 1, wherein the MDB device is further configured to determine the estimated offset within a maximum or minimum offset value.

9. The system according to claim 1, wherein the MDB device is further configured to determine the estimated offset based on a lookup table.

10. The system according to claim 9, wherein the MDB device is further configured to generate the lookup table by simulations of the kinematic chain and/or by measurements of the kinematic chain.

11. The system according to claim 9, wherein the MDB device is further configured to generate the lookup table in terms of a multidimensional lookup table.

12. The system according to claim 9, wherein the MDB device is further configured to determine the estimated offset by an interpolation of the lookup table.

13. The system according to claim 12, wherein:
the MDB device is further configured to provide a linear interpolation or a non-linear interpolation of the lookup table in order to determine the estimated offset; and/or
the MDB device is further configured to provide a curve fitting based on the lookup table in order to determine the estimated offset.

14. A method for active motion displacement control of a robot, the method comprising the steps of:
setting a desired position of a portion of a kinematic chain, by means of a device control layer (DCL) device;
generating a motion profile for at least one actor device coupled to the portion of the kinematic chain based on the set desired position of the portion of the kinematic chain by means of a motor driver board (MDB) device;
moving the portion of the kinematic chain to an actual position based on the generated motion profile by means of the actor device;
measuring the actual position and, based on the measured actual position, providing position data of the portion of the kinematic chain by means of a sensor device; and
determining an estimated offset by means of the MDB device based on a robotic chain with a first axis comprising a first lifting capacity and a second axis with a second lifting capacity, wherein the second lifting capacity is higher than the first lifting capacity; and
providing a feedback path to a control loop used by the MDB device based on the provided position data of the portion, the desired position of the portion, and the estimated offset, by means of the MDB device.

* * * * *